United States Patent
Mao et al.

(10) Patent No.: US 12,358,162 B2
(45) Date of Patent: Jul. 15, 2025

(54) SYSTEM AND METHOD FOR CONTROLLING THE ROBOT, ELECTRONIC DEVICE AND COMPUTER READABLE MEDIUM

(71) Applicant: ABB Schweiz AG, Baden (CH)

(72) Inventors: Yichao Mao, Shanghai (CN); Xinyu Fang, Shanghai (CN); Shunchong Li, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 367 days.

(21) Appl. No.: 17/758,938

(22) PCT Filed: Jan. 22, 2020

(86) PCT No.: PCT/CN2020/073905
§ 371 (c)(1),
(2) Date: Jul. 15, 2022

(87) PCT Pub. No.: WO2021/147034
PCT Pub. Date: Jul. 29, 2021

(65) Prior Publication Data
US 2023/0047834 A1    Feb. 16, 2023

(51) Int. Cl.
*B25J 13/08* (2006.01)
*B25J 9/16* (2006.01)
*B25J 19/02* (2006.01)

(52) U.S. Cl.
CPC ........... *B25J 13/089* (2013.01); *B25J 9/1653* (2013.01); *B25J 9/1669* (2013.01); *B25J 9/1694* (2013.01);
(Continued)

(58) Field of Classification Search
CPC ...... B25J 13/089; B25J 9/1653; B25J 9/1669; B25J 9/1694; B25J 19/02;
(Continued)

(56) References Cited

U.S. PATENT DOCUMENTS

| | | | |
|---|---|---|---|
| 8,805,585 B2 * | 8/2014 | Nishihara | B25J 9/1697 29/709 |
| 9,242,799 B1 | 1/2016 | O'Brien et al. | |

(Continued)

FOREIGN PATENT DOCUMENTS

| | | |
|---|---|---|
| CN | 204713933 U | 10/2015 |
| CN | 106695792 A | 5/2017 |

(Continued)

OTHER PUBLICATIONS

International Search Report and Written Opinion, issued by the ISA/CN National Intellectual Property Administration; regarding corresponding patent application Serial No. PCT/CN2020/073905; dated Oct. 28, 2020; 9 pages.

(Continued)

*Primary Examiner* — Sohana Tanju Khayer
(74) *Attorney, Agent, or Firm* — GREENBERG TRAURIG, LLP (57) ABSTRACT

Systems, devices, and methods for controlling a robot. Some methods include, in response to determining that an object enters a reachable area of the robot, triggering a first sensor to sense a movement of the object; determining first position information of the object based on data received from the first sensor; determining second position information of the object based on second data received from a second sensor; and generating a first prediction of a target position at which the object is operated by the robot. In this way, the robot can complete an operation for the object on the AGV within a limit operation time during which the AGV passes through the reachable area of the robot. Meanwhile, by collecting the sensing data from different sensor groups, a target position at which the object is handled by the robot may be predicted more accurately.

24 Claims, 6 Drawing Sheets

(52) U.S. Cl.
CPC ..... *B25J 19/02* (2013.01); *G05B 2219/39102* (2013.01); *G05B 2219/40554* (2013.01)

(58) Field of Classification Search
CPC .......... G05B 2219/39102; G05B 2219/40554; Y02P 90/60
See application file for complete search history.

(56) References Cited

U.S. PATENT DOCUMENTS

| | | | | |
|---|---|---|---|---|
| 9,776,808 | B1* | 10/2017 | Ooba | B65G 47/1428 |
| 10,137,567 | B2* | 11/2018 | Chen | B25J 9/0003 |
| 11,409,306 | B2* | 8/2022 | Tomono | G05D 1/695 |
| 2013/0035783 | A1 | 2/2013 | Scheuerman et al. | |
| 2013/0325181 | A1* | 12/2013 | Moore | B25J 13/086 901/31 |
| 2014/0067317 | A1* | 3/2014 | Kobayashi | G05D 3/00 702/153 |
| 2016/0001445 | A1* | 1/2016 | Setsuda | G05B 19/425 700/260 |
| 2017/0326734 | A1* | 11/2017 | Iida | B25J 9/1674 |
| 2018/0126553 | A1* | 5/2018 | Corkum | B25J 9/1697 |
| 2018/0250824 | A1* | 9/2018 | Hannya | B25J 9/1676 |
| 2019/0070730 | A1* | 3/2019 | Morioka | B25J 9/1666 |
| 2019/0112134 | A1* | 4/2019 | Ooba | B65G 43/08 |
| 2019/0160682 | A1* | 5/2019 | Sato | B25J 9/162 |
| 2019/0262993 | A1* | 8/2019 | Cole | B25J 9/1676 |
| 2019/0366544 | A1* | 12/2019 | Oka | B25J 9/1666 |
| 2020/0070343 | A1* | 3/2020 | Thomaz | B25J 9/163 |
| 2020/0171680 | A1* | 6/2020 | Roziere | B25J 13/087 |
| 2020/0269429 | A1* | 8/2020 | Chavez | B25J 15/0616 |
| 2020/0368911 | A1* | 11/2020 | Takeuchi | B25J 9/1694 |
| 2021/0016447 | A1* | 1/2021 | Iwayama | B25J 13/086 |
| 2021/0114209 | A1* | 4/2021 | Wada | B25J 9/161 |
| 2022/0024037 | A1* | 1/2022 | Lee | B25J 13/08 |
| 2022/0362933 | A1* | 11/2022 | Mishima | B25J 9/1664 |

FOREIGN PATENT DOCUMENTS

| | | |
|---|---|---|
| CN | 109267773 A | 1/2019 |
| EP | 3579174 A1 | 12/2019 |
| JP | H-11123682 A | 5/1999 |
| WO | 2016175158 A1 | 11/2016 |

OTHER PUBLICATIONS

Ilhan Konukseven, et al., "Multisensor Controlled Robotic Tracking and Automatic Pick and Place", Department of Mechanical Engineering, Middle East Technical University, Ankara, Turkey, 1356-1362, Proc. IROS 97, 1997; 7 pages.

Konukseven et al., "Multisensor Controlled Robotic Tracking and Automatic Pick and Place", 1997 IEEE, Pros. IROS 97, pp. 1356-1362; 7 pages.

* cited by examiner

SYSTEM AND METHOD FOR CONTROLLING THE ROBOT, ELECTRONIC DEVICE AND COMPUTER READABLE MEDIUM

CROSS-REFERENCE TO RELATED APPLICATIONS

This is a national stage application which claims priority to International patent application Serial No.: PCT/CN2020/073905, filed on Jan. 22, 2020; and which is herein incorporated by reference in its entirety.

FIELD

Embodiments of the present disclosure generally relate to a system and a method for controlling the robot, an electronic device and computer readable medium.

BACKGROUND

The amount of auto guided vehicle (AGV) used in the factory is growing these years due to its high flexibility, efficiency and capacity. In nowadays applications, most AGVs are used to transport materials and significantly improve the efficiency of factory.

In this case, some external devices are required to capture or operate the object, including components, elements and materials carried by the AGV. Using industrial robots to handle object on the AGV is one alternative solution for the factory.

Conventionally, there are two methods for robot to handle material on the AGV. For example, the AGV may be constrained when it moves into the cell and the object carried by the AGV may be kitted for handling by the robot. Furthermore, The AGV may be stopped in an operating location adjacent to the robot and the object carried by the AGV may be handled by robot guided by sensors. In both solutions, the AGV may be required to stop when the robot is operating.

SUMMARY

Embodiments of the present disclosure provide a system and a method for controlling the robot and computer readable medium.

In a first aspect, a method is provided. The method comprises in response to determining that an object to be operated by the robot enters a reachable area of the robot, triggering a first sensor to sense a movement of the object in the reachable area; determining first position information of the object based on first sensing data received from the first sensor, the first sensor obtaining the first sensing data by sensing the movement of the object; determining second position information of the object based on second sensing data received from a second sensor, the second sensor obtaining the second sensing data by sensing relative motion between the robot and the object; and generating, based on the first and the second position information, a first prediction of a target position at which the object is operated by the robot.

In this way, the robot can complete an operation for the object on the AGV within a limit operation time during which the AGV passes through the reachable area of the robot. That is, it is unnecessary to stop the AGV when the robot operates the object, which may avoid the waste of the time and the extra energy consumption. Meanwhile, by collecting the sensing data from different sensor groups, a target position at which the object is handled by the robot may be predicted more accurately.

In some embodiments, determining the first position information comprises receiving the first sensing data from the first sensor in a first time period; obtaining, from the first sensing data, a set of coordinate parameters of the object in a first coordinate system of the first sensor; and determining the first position information based on the set of coordinate parameters.

In some embodiments, determining the second position information comprises receiving the second sensing data from the second sensor in a second time period, the second time period overlapping with a first time period for receiving the first set of sensing data; obtaining, from the second sensing data, a first set of position relationships between a terminal joint of the robot and the object in a second coordinate system of the second sensor; and determining the second position information based on the first set of position relationships.

Considering a wide measurement range for the moving AGV, in this solution proposed in the first aspect, different sensor group may be arranged in different observing locations and the sensing data from different sensor groups will be collected and transformed to the respective position information, which is advantageous for prediction of the target position, because the result of the prediction will be more accurate and the prediction process will be accelerated at the same time.

In some embodiments, generating the first prediction comprises obtaining, from the first position information, a first set of sampled parameters characterizing a reference position of the object at a predetermined time point; obtaining, from the second position information, a second set of sampled parameters characterizing a reference position relationship between a terminal joint of the robot and the object at the predetermined time point; and generating the first prediction of the target position by fusing the first set of sampled parameters and the second set of sampled parameters based on a predetermined fusion mode associated with an expected operation to be performed by the robot.

In some embodiments, the predetermined fusion mode comprises at least one of the following a predictor mode, a filter mode, a sum mode and a subtraction mode.

In the process of data fusion, different position parameters determined by the sensing data from different sensor groups at the same acquisition time point can be considered as position information for predicting the target position. Since the sensing data provides different position parameters in multiple view points, a high-quality prediction results may be obtained more efficiently. Meanwhile, a plurality of fusion mode corresponding to the certain operator may be predetermined based on the desired operation process of the robot. In this way, any excepted robot operation procedure may be more easily implemented and developed.

In some embodiments, the method further comprises generating the command for controlling the robot based on the first prediction.

In some embodiments, the method further comprises determining third position information of a terminal joint of the robot based on third sensing data received from a third sensor, the third sensing data obtaining by sensing a motion of the terminal joint of the robot; and generating a second prediction of the target position based on the first position information and the third position information.

In some embodiments, the method further comprises generating a third prediction of the target position by fusing the first prediction of the target position and the second prediction of the target position.

In some embodiments, the method further comprises generating the command for controlling the robot based on the third prediction. In this way, a final prediction of the target position may be generated by fusing multiple preliminary predictions and the robot can be operated more precisely based on the two-stages prediction. Furthermore, the servo performance for robot may be improved.

In some embodiments, the object is carried by an auto guided vehicle.

In some embodiments, the first sensor is arranged on a terminal joint of the robot and the second sensor is arranged in an environment where the object and the robot can be observed by the second sensor.

In some embodiments, the third sensor is arranged at a base of the robot or on an auto guided vehicle carrying the object.

In a second aspect, a system is provided. The system comprises a sensor selector coupled to a first sensor and configured to in response to determining that an object to be operated by the robot enters a reachable area of the robot, trigger the first sensor to sense a movement of the object in the reachable area; a data collector coupled to the first sensor and a second sensor and configured to determine first position information of the object based on first sensing data received from the first sensor, the first sensor obtaining the first sensing data by sensing the movement of the object and determine second position information of the object based on second sensing data received from the second sensor, the second sensor obtaining the second sensing data by sensing a relative motion between the robot and the object; and a first estimator coupled to the data collector and configured to generate, based on the first and the second position information, a first prediction of a target position at which the object is operated by the robot.

In some embodiments, the data collector is further configured to receive the first sensing data from the first sensor in a first time period; obtain, from the first sensing data, a set of coordinate parameters of the object in a first coordinate system of the first sensor; and determine the first position information based on the set of coordinate parameters.

In some embodiments, the data collector is further configured to receive the second sensing data from the second sensor in a second time period, the second time period overlapping with a first time period for receiving the first set of sensing data; obtain, from the second sensing data, a first set of position relationships between a terminal joint of the robot and the object in a second coordinate system of the second sensor; and determine the second position information based on the first set of position relationships.

In some embodiments, the first estimator is further configured to obtain, from the first position information, a first set of sampled parameters characterizing a reference position of the object at the predetermined time point; obtain, from the second position information, a second set of sampled parameters characterizing a reference position relationship between a terminal joint of the robot and the object at the predetermined time point; and generate the first prediction of the target position by fusing the first set of sampled parameters and the second set of sampled parameters based on a predetermined fusion mode associated with an expected operation to be performed by the robot.

In some embodiments, the predetermined fusion mode comprises at least one of the following a predictor mode, a filter mode, a sum mode and a subtraction mode.

In some embodiments, the system further comprises a command generator coupled to the first estimator and configured to generate the command for controlling the robot based on the first prediction.

In some embodiments, the data collector is further coupled to a third sensor and configured to determine third position information of a terminal joint of the robot based on third sensing data received from the third sensor, the third sensing data obtaining by sensing a motion of the terminal joint of the robot and generate a second prediction of the target position based on the first position information and the third position information.

In some embodiments, the system further comprises a second estimator coupled to the first estimator and configured to generate a third prediction of the target position by fusing the first prediction of the target position and the second prediction of the target position.

In some embodiments, the system further comprises a command generator coupled to the second estimator and configured to generate the command for controlling the robot based on the third prediction.

In some embodiments, the object is carried by an auto guided vehicle.

In some embodiments, the first sensor is arranged on a terminal joint of the robot and the second sensor is arranged in an environment where the object and the robot can be observed by the second sensor.

In some embodiments, the third sensor is arranged at a base of the robot or on an auto guided vehicle carrying the object.

In a third aspect, an electronic device is provided. The electronic device comprises a processor; and a memory coupled to the processor and storing instructions for execution, the instructions, when executed by the processor, causing the device to perform the method of the first aspect.

In a fourth aspect, a computer readable medium is provided. The computer readable medium comprises program instructions for causing an electronic device to perform at least the method of the first aspect.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As described above, the amount of auto guided vehicle (AGV) used in the factory is growing these years due to its high flexibility, efficiency and capacity. Since the object carried by the AGV may be handled by other external devices, such as industrial robots, the AGV may be required to stop when the robot is operating in a conventional way.

However, the stopping of the AGV may cause extra energy consumption and unexpected time cost. Thus, it is to be desired that the robot could be guide to operate the object on a moving AGV without stopping the AGV during operation.

For guiding a robot handle the object on the moving AGV, two challenges may be faced. First, the operation time is limited while the AGV is running through under the robot. Because when the robot is mounted on a solid base and therefore its reachable area is limited. The robot should complete the operation when the AGV is within its reachable area. Second, the accuracy of operation is required. In most cases, the robot may have to track the object accurately to handle it. However, the measurement range for a moving AGV is wide and therefore it is hard to guarantee the measurement accuracy and range in the same time.

Figure 1:
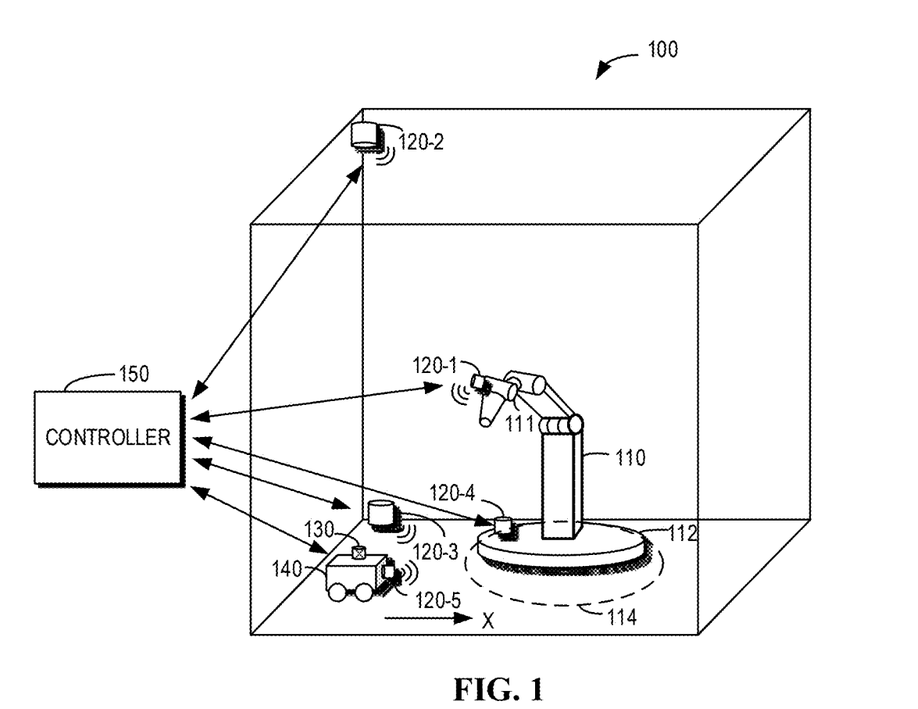
FIG. 1 shows an example operating environment in which embodiments of the present disclosure may be implemented.

FIG. 1 shows an example operating environment 100 in which embodiments of the present disclosure may be implemented. As shown in FIG. 1, the operating environment 100 may comprise a robot 110. The robot 110 may fixed on the ground or on a control console by a base 112. The robot 110 may comprise an operating arm having a terminal joint 111. The operating arm of the robot 110 can operate an object in a reachable area 114 of the robot 110.

In the operating environment 100, a conveyor 140, such as an AGV, moves along the direction X and may pass through the reachable area 114 of the robot 110. An object 130 may be carried on the conveyor 140 and operated by the robot 110 in an operating position. For example, the robot 110 may be operated to capture the object or perform a specific action for the object.

The operating environment 100 as shown in FIG. 1 may also comprise a plurality of sensors 120-1, 120-2, 120-3, 120-4 and 120-5 and a controller 150 coupled to these sensors to collect the sensing data from these sensors. The controller 150 may communicate with sensors 120-1, 120-2, 120-3, 120-4 and 120-5 by a communication module (not shown) wired or wireless.

For example, the sensor 120-1 (hereafter may also referred to as the first sensor 120-1) may be arranged on the terminal joint 111 of the robot 110. The sensor 120-1 may be referred to an in-hand sensor, which can provide an accurate measurement in a very limit range, e.g. in the reachable area. Hence, the sensor 120-1 need move with the robot to track the motion of conveyor 140, which keep the object in their measurement range.

There are also some sensors arranged in the environment where both the robot and the object may be observed, such as sensors 120-2 and 120-3 (hereafter may also referred to as the second sensors 120-2 and 120-3) in the operating environment 100, which may be referred a ground-sensor or on-roof sensor. Compared with in-hand sensors, the measurement of a ground-sensor or on-roof sensor has less accuracy but has larger range. The sensors 120-2 and 120-3 can locate the AGV while the AGV are out of the measurement range of the in-hand sensors, which enable the robot to know where the AGV is and how fast it moves before the AGV arrives or when the in-hand sensors lose the target.

Further, a sensor 120-5 (hereafter may also referred to as the third sensor 120-5) may be mounted on the conveyor 140, which may be referred to as an on-broad sensor. This sensor 120-5 can measure the motion of conveyor 140 globally, such as the encoder/IMU on the conveyor 140, or SLAM system of conveyor 140. However, sending this feedback from AGV to the controller 150 may suffer a high time delay and require extra network device to establish communication. Hence, the on-broad sensor can be used to measure the data with less timeliness requirements, such as the average moving speed of the conveyor 140, the orientation of the conveyor 140, etc.

Moreover, the operating environment 100 may comprise other sensor, such as sensor 120-4 (hereafter may also referred to as the third sensor 120-4) arranged on the base 112 of the robot 110, which monitor a motion of the terminal joint 111 of the robot and the movement of the conveyor 140. It is to be understood that the number of sensors shown in FIG. 1 is given for the purpose of illustration without suggesting any limitations. The operating environment 100 may include any suitable number of sensors.

As motioned above, to achieving an accurately controlling of the robot 110 without stopping the conveyor 140 embodiments of the present disclosure proposed a solution for controlling the robot. Sensing data from different sensing group may be collected and fused for predicting a target position of the robot.

Figure 2:
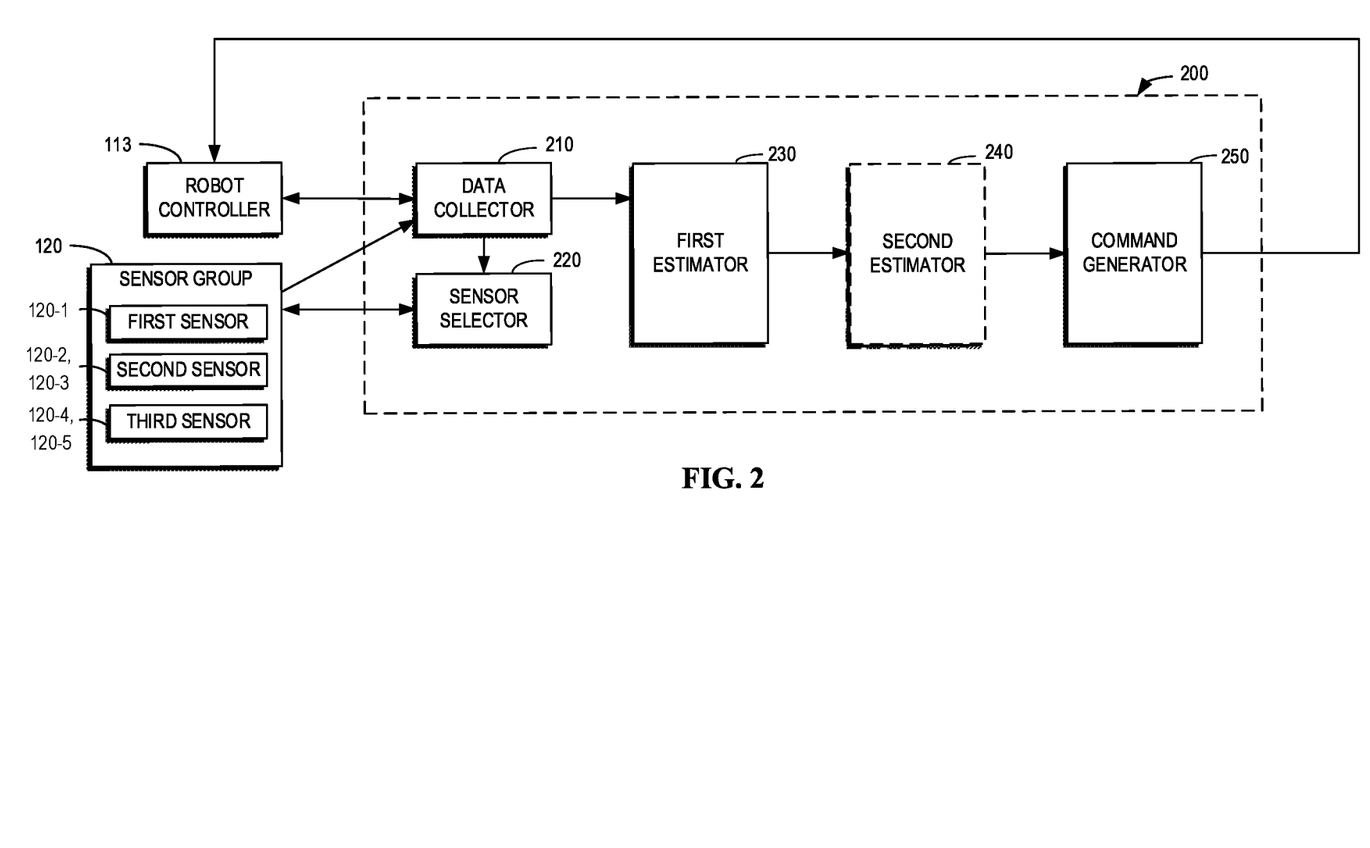
FIG. 2 shows a schematic diagram of a system for controlling the robot according to embodiments of the present disclosure.

Principle and implementations of the present disclosure will be described in detail below with reference to FIGS. 2 to 5. FIG. 2 shows a schematic diagram of a system for controlling the robot according to embodiments of the present disclosure. For the purpose of discussion, the system 200 will be described with reference to FIG. 1. It would be appreciated that although the system 200 has been described in the operating environment 100 of FIG. 1, this system 200 may be likewise applied to other operating environments.

As shown in FIG. 2, the system 200 may comprise a data collector 210. The data collector 210 may be coupled to a sensing group 120 including the first sensor 120-1, the second sensors 120-2 and 120-3 and the third sensor 120-4 and 120-5 and receive the sensing data from at least one sensor of them. Alternatively, the data collector 210 may also be coupled to a robot controller 113 and obtain the feedback data associated with a motion of the terminal joint of the robot and characterizing parameters of the robot 110, such as parameters of the reachable range of the robot.

As described above, the second sensor 120-2 and 120-3 may have a wide measurement range. Therefore, the second sensor may monitor the conveyor 140 first. The second sensor transmits the sensing data to the data collector 210. At this moment, the robot 110 may be in a waiting state, i.e. may be stationary.

Once the data collector 210 determines that the conveyor 140 enters the reachable range, the data collector 210 may inform sensor selector 220, which is coupled to the sensor group, to trigger the first sensor to sense the movement of the conveyor 140.

The sensor selector 220 could trigger any sensor of the sensor group to perform the sensing procedure according to the feedback of the data collector 210 or the command of the system 200, for example, track the movement of the object 130 or a motion of the terminal joint 111 of the robot 110. For example, once the first sensor lost the conveyor 140, the sensor selector 220 may chose other sensor to monitor the conveyor 140. Thus, the tracking procedure may depend on the combination of sensors fused during tracking, which may improve the stability and the reliability of the tracking.

In some embodiments, the first sensor 120-1 may obtain the first sensing data by sensing the movement of the object 130 and transmit the first sensing data to the data collector 210. The data collector 210 may determine first position information of the object based on the set of coordinate parameters. For example, the data collector 210 may obtain a set of coordinate parameters of the object in a first coordinate system of the first sensor and determine the first position information based on the set of coordinate parameters.

Furthermore, the second sensor may continue to transmit the second sensing data to the data collector 210. For example, the data collector 210 may obtain a set of position relationships between a terminal joint of the robot and the object in a second coordinate system of the second sensor and determine the second position information based on the set of position relationships.

For example, the first sensing data may be referred to as a set of images captured by the first sensor in a first time period and the second sensing data may be referred to as a set of images captured by the second sensor in a second time period. The second time period may be overlapped with the first time period.

Furthermore, the data collector may also record the sensing time point for each sensing data and calibrate the time delay of the sensing data. This aspect will not be discussed here.

Considering a wide measurement range for the moving AGV, in this solution, different sensor group may be arranged in different observing locations and the sensing data from different sensor groups will be collected and transformed to the respective position information, which is advantageous for prediction of the target position, because the result of the prediction will be more accurate and the prediction process will be accelerated at the same time.

As shown in the FIG. 2, the system 200 may further comprise a first estimator 230. The first estimator 230 may be coupled to the data collectors and configured to generate a first prediction of a target position based on the first and the second position information. The object 130 may be operated by the robot 230 at the target position.

In some embodiments, the first position information and the second position information could be fused in the first estimator 230. For example, the first estimator 230 may obtain a first set of sampled parameters from the first position information and obtain a second set of sampled parameters from the second position information. The first set of sampled parameters may characterize a reference position of the object 130 at a predetermined time point and the second set of sampled parameters may characterize a reference position relationship between the robot 110 and the object 130 at the same time point.

In some embodiments, the first estimator 230 may further generate the first prediction of the target position by fusing the first set of sampled parameters and the second set of sampled parameters based on a fusion mode, which may be associated with an expected operation to be performed by the robot.

Figure 3A:
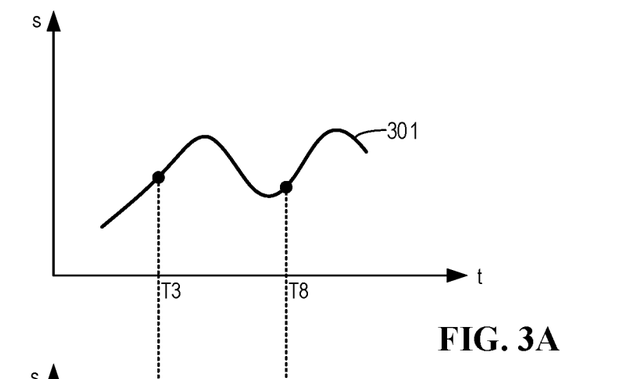
FIGS. 3A-3C show example processes of data fusion according to embodiments of the present disclosure.
Figure 3B:
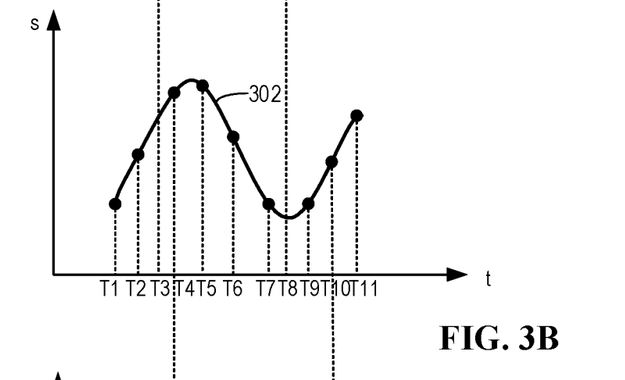

With reference to FIGS. 3A and 3B, the data fusion of the first set of sampled parameters from the first position information and the second set of sampled parameters from the second position information may be further described in detail.

FIG. 3A shows an example of a curve 301 of a sampled signal associated with the second position information and FIG. 3B shows an example of a curve 302 of a sampled signal associated with the first position information. As shown in FIG. 3A, the second set of sampled parameters may refer to parameters at time points T3 and T8. That is, a set of parameters sampled at time point T3 of the curve 301 may reflect the position relationship between the robot 110 and the object 130 at the time point T3 captured by the second sensor 120-2, for example. To fuse the first and the second sets of parameters, parameters sampled at T3 of curve 302 may be required. However, the parameters sampled at T3 of the curve 302 may not be read from the curve 302 directly. That is, the first set of sampled parameters may not be direct obtained from the first position information. Instead, the sampled parameters at time point T3 of the curve 302 may be calculated based on the parameters sampled at other sampled time points, for example, based on parameters sampled at T2 and T4 of the curve 302. The sampled parameters at time point T3 of the curve 302 may reflect the position of the object at the time point T3. Then, the sampled parameters at time point T3 of the curve 301 may be fused with sampled parameters at time point T3 of the curve 302, to generate a prediction of the target position of the robot. For the data fusion of the parameters sampled at time point T8 of both curve 301 and 302, an analogous procedure may be performed.

In some embodiments, the first estimator 230 also include an operator pool to provide the operators corresponding to the fusion mode, such as a Kalman mode, a Predictor mode, a Filter mode, an Observer mode, a Sum mode or a Subtraction mode. These fusion modes may be preconfigured for the specific task assigned by the sensor model.

Referring back to FIG. 2, the system 200 may also comprises a command generator 250 coupled to the first estimator 230. The command generator 250 may be configured to generate a command for controlling the robot 110 based on the first prediction of the target position. The command generator 250 may be coupled to the robot controller 113 to transmit the command to the robot controller 113.

In the process of data fusion, different position parameters determined by the sensing data from different sensor groups at the same acquisition time point can be considered as position information for predicting the target position. Since the sensing data provides different position parameters in multiple view points, a high-quality prediction results may be obtained more efficiently. Meanwhile, a plurality of fusion mode corresponding to the certain operator may be predetermined based on the desired operation process of the robot. In this way, any excepted robot operation procedure may be more easily implemented and developed.

In some embodiments, more than one sensor may transmit the sensing data to the data collector 210 and therefore a plurality of the first predictions of the target position may be generated at the first estimator 230. In this case, the plurality of the first predictions may be considered as preliminary predictions and may be further fused to generate a final prediction.

Alternatively, the system 200 may also comprise a second estimator 240. As shown in FIG. 3, the third sensor 120-4, 120-5 may transmit the sensing data to the data collector 210. The data collector 210 may determine the third position information of a terminal joint 111 of the robot 110 based on third sensing data received from the third sensor. The third sensing data may be obtained by sensing a motion of the terminal joint 111 of the robot 110. As an option, the information of a terminal joint 111 of the robot 110 may also be obtained from the robot controller 130.

As described above, the first position information and the second position information obtained from the data collector 210 may be fused to generate a prediction of the target position of the robot 110. Similarly, the first estimator 230 may further generate a second prediction of the target position based on the first position information and the third position information, for example by fusing the first position information and the third position information.

Figure 3C:
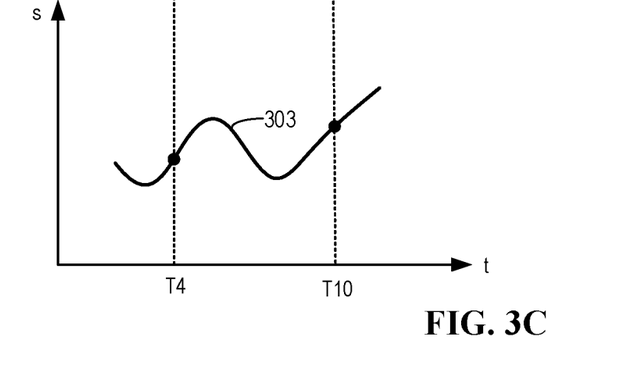

Further referring to FIGS. 3B and 3C, the procedure of the data fusion of the first position information and the third position information may be similar with that of the first position information and the second position information.

FIG. 3C shows an example of a curve 303 of a sampled signal associated with the third position information and FIG. 3B shows an example of a curve 302 of a sampled signal associated with the first position information. As shown in FIG. 3C, the third set of sampled parameters may refer to parameters at time points T4 and T10. That is, a set of parameters sampled at time point T4 of the curve 303 may reflect the position of the terminal joint 111 captured by the third sensor at the time point T4, for example. To fuse the first and the third sets of parameters, parameters sampled at T4 of curve 302 may be required. However, the parameters sampled at T4 of the curve 302 may not be read from the curve 302 directly. That is, the first set of sampled parameters may not be direct obtained from the first position information. Instead, the sampled parameters at time point T4 of the curve 302 may be calculated based on the parameters sampled at other sampled time points, for example, based on parameters sampled at T2 and T5 of the curve 302. The sampled parameters at time point T4 of the curve 302 may reflect the position of the object at the time point T4. Then, the sampled parameters at time point T4 of the curve 303 may be fused with sampled parameters at time point T4 of the curve 302, to generate a further prediction of the target position of the robot 110. For the data fusion of the parameters sampled at time point T10 of both curve 303 and 302, an analogous procedure may be performed.

Figure 4A:
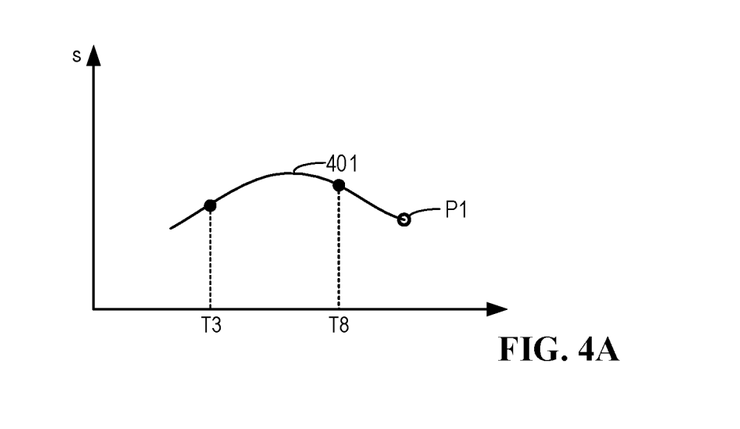
FIGS. 4A-4B show example results of data fusion shown in FIGS. 3A-3C according to embodiments of the present disclosure.
Figure 4B:
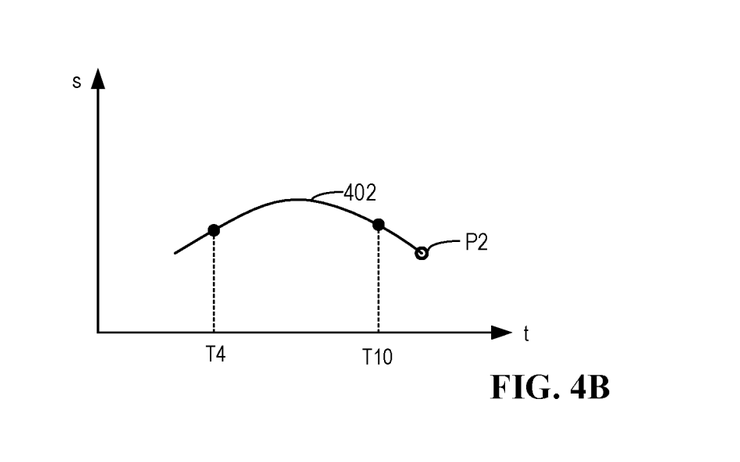

FIGS. 4A-4B show example results of data fusion shown in FIGS. 3A-3C according to embodiments of the present disclosure. FIG. 4A shows a result of data fusion of the first and the second position information and the FIG. 4B shows a result of data fusion of the first and the third position information. For example, the value of the curve 401 shown in FIG. 4A represent a result of data fusion of the parameters of the first position information and the second position information at the time point T3. Based on the curve 401 obtained by fusing the first and the second position information and the curve 402 obtained by fusing the first and the third position information, two preliminary prediction of the target position may be generated, namely the value of P1 in curve 401 and the value P2 of the curve 402.

Referring back to FIG. 3, the system 200 may also comprise a second estimator 240. The second estimator 240 may be coupled to the first estimator 230 and generate a third prediction of the target position by fusing the first prediction of the target position and the second prediction of the target position. For example, as shown in FIGS. 4A and 4B, the preliminary prediction of the target position P1 and the preliminary prediction of the target position P2 may be fused, the fused value may be considered as a final prediction of the target position. In this case, the command generator 250 may generate the command for controlling the robot 110 based on this final prediction of the target position.

The data fusion for generating the final prediction may be considered as a second fusion procedure. The preliminary predictions of target position/orientation may be sent to the buffer with a timestamp in the second fusion module in the second estimator. In most applications, the object moves at a relatively lower speed compared to the motion of the robot. Hence, the regression of target position and orientation may provide a more reliable prediction than the regression of sensor data.

It is to be understood that the system 200 as shown in FIG. 2 may be implemented with any hardware and software. For example, the system 200 may be implemented as the controller 150 as shown in FIG. 1. The system 200 may also be implemented as an integrate chip. The components of the system 200 may be considered as entities capable of performing certain functions, such as data collectors, estimators, instruction generators, and the like. The components in the system 200 may also be considered as virtual modules capable of implementing certain functions.

In this way, the robot can complete an operation for the object on the AGV within a limit operation time during which the AGV passes through the reachable area of the robot. That is, it is unnecessary to stop the AGV when the robot operates the object, which may avoid the waste of the time and the extra energy consumption. Meanwhile, by collecting the sensing data from different sensor groups, a target position at which the object is handled by the robot may be predicted more accurately.

Figure 5:
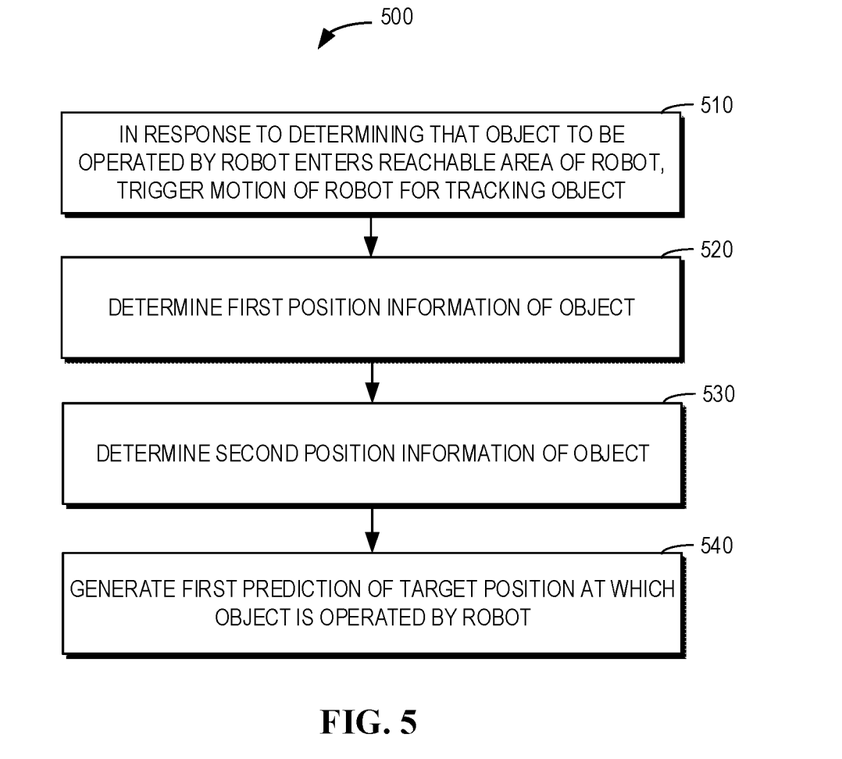
FIG. 5 shows a flowchart illustrating a method for controlling the robot according to embodiments of the present disclosure.

FIG. 5 shows a flowchart illustrating a method for controlling the robot according to embodiments of the present disclosure. For the purpose of discussion, the method 500 will be described from the perspective of the system 200 with reference to FIG. 2.

At 510, if the system 200 determines that an object to be operated by the robot enters a reachable area of the robot, the system 200 triggers a first sensor to sense a movement of the object in the reachable area.

At 520, the system 200 determines first position information of the object based on first sensing data received from the first sensor. The first sensor may obtain the first sensing data by sensing the movement of the object. At 530, the system 200 determines second position information of the object based on second sensing data received from a second sensor. The second sensor obtaining the second sensing data by sensing relative motion between the robot and the object In some embodiments, determining the first position information comprises receiving the first sensing data from the first sensor in a first time period; obtaining, from the first sensing data, a set of coordinate parameters of the object in a first coordinate system of the first sensor; and determining the first position information based on the set of coordinate parameters.

In some embodiments, determining the second position information comprises receiving the second sensing data from the second sensor in a second time period, the second time period overlapping with a first time period for receiving the first set of sensing data; obtaining, from the second sensing data, a first set of position relationships between a terminal joint of the robot and the object in a second coordinate system of the second sensor; and determining the second position information based on the first set of position relationships.

At 640, the system 200 generates, based on the first and the second position information, a first prediction of a target position at which the object is operated by the robot.

In some embodiments, generating the first prediction comprises obtaining, from the first position information, a first set of sampled parameters characterizing a reference position of the object at a predetermined time point; obtaining, from the second position information, a second set of sampled parameters characterizing a reference position relationship between a terminal joint of the robot and the object at the predetermined time point; and generating the first prediction of the target position by fusing the first set of sampled parameters and the second set of sampled parameters based on a predetermined fusion mode associated with an expected operation to be performed by the robot.

In some embodiments, the fusion mode comprises at least one of a predictor mode, a filter mode, a sum mode and a subtraction mode.

In some embodiments, the system 200 may generate a command for controlling the robot based on the first prediction.

In some embodiments, the system 200 may further determine third position information of a terminal joint of the robot based on third sensing data received from a third sensor and generate a second prediction of the target position based on the first position information and the third position information. The third sensing data obtaining by sensing a motion of the terminal joint of the robot.

In some embodiments, the system 200 may further generate a third prediction of the target position by fusing the first prediction of the target position and the second prediction of the target position.

In some embodiments, the system 200 may further generate the command for controlling the robot based on the third prediction.

In some embodiments, the object is carried by an auto guided vehicle.

In some embodiments, the first sensor is arranged on a terminal joint of the robot and the second sensor is arranged in an environment where the object and the robot can be observed by the second sensor.

In some embodiments, the third sensor is arranged at a base of the robot or on an auto guided vehicle carrying the object.

Figure 6:
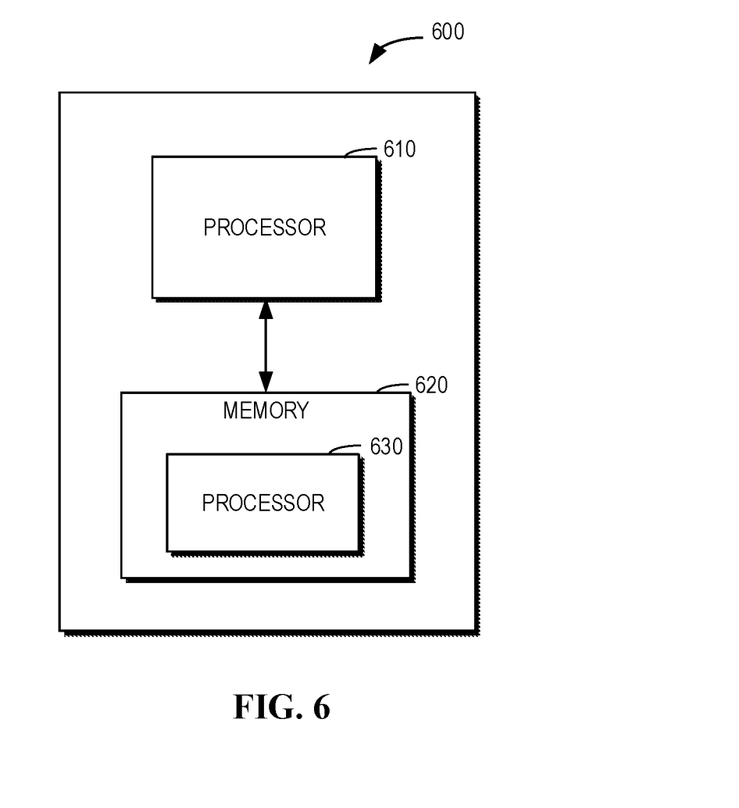
FIG. 6 shows a block diagram of an example computer readable medium in accordance with some example embodiments of the present disclosure.

FIG. 6 is a simplified block diagram of a device 600 that is suitable for implementing embodiments of the present disclosure. The device 600 may be provided to implement the system 200 as shown in FIG. 6.26. As illustrated in FIG. 6, the device 600 may comprise a computer processor 610 coupled to a computer-readable memory unit 620, and the memory unit 620 comprises instructions 622. When executed by the computer processor 610, the instructions 622 may implement the method for controlling the robot as described in the preceding paragraphs, and details will be omitted hereinafter.

In some embodiments of the present disclosure, a computer readable medium for simulating the at least one object in the manufacturing line is provided. The computer readable medium has instructions stored thereon, and the instructions, when executed on at least one processor, may cause at least one processor to perform the method for controlling the robot as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for controlling a robot comprising:
   in response to determining that an object to be operated by the robot enters a reachable area of the robot, triggering a first sensor to sense a movement of the object in the reachable area, wherein a second sensor senses the object entering the reachable area;
   determining first position information of the object in a first coordinate system based on first sensing data received from the first sensor, the first sensor obtaining the first sensing data by sensing the movement of the object;
   determining second position information of the object in a second coordinate system based on second sensing data received from the second sensor, the second sensor obtaining the second sensing data by sensing relative motion between the robot and the object; and
   generating, based on the first position information and the second position information, a first prediction of a target position at which the object is operated by the robot,
   wherein the first sensor is arranged on a terminal joint of the robot and the second sensor is arranged in an environment where the object and the robot can be observed by the second sensor.

2. The method of claim 1, wherein determining the first position information comprises:
   receiving the first sensing data from the first sensor in a first time period;
   obtaining, from the first sensing data, a set of coordinate parameters of the object in the first coordinate system of the first sensor; and
   determining the first position information based on the set of coordinate parameters.

3. The method of claim 1, wherein determining the second position information comprises:
   receiving the second sensing data from the second sensor in a second time period, the second time period overlapping with a first time period for receiving the first sensing data;
   obtaining, from the second sensing data, a first set of position relationships between a terminal joint of the robot and the object in the second coordinate system of the second sensor; and
   determining the second position information based on the first set of position relationships.

4. The method of claim 1, wherein generating the first prediction comprises:
   obtaining, from the first position information, a first set of sampled parameters characterizing a reference position of the object at a predetermined time point;
   obtaining, from the second position information, a second set of sampled parameters characterizing a reference position relationship between a terminal joint of the robot and the object at the predetermined time point; and
   generating the first prediction of the target position by fusing the first set of sampled parameters and the second set of sampled parameters based on a predetermined fusion mode associated with an expected operation to be performed by the robot.

5. The method of claim 4, wherein the predetermined fusion mode comprises at least one of:
   a predictor mode,
   a filter mode,
   a sum mode, or
   a subtraction mode.

6. The method of claim 1, further comprising:
   generating a command for controlling the robot based on the first prediction.

7. The method of claim 1, further comprising:
   determining third position information of a terminal joint of the robot based on third sensing data received from a third sensor, the third sensing data obtaining by sensing a motion of the terminal joint of the robot; and
   generating a second prediction of the target position based on the first position information and the third position information.

8. The method of claim 7, further comprising:
   generating a third prediction of the target position by fusing the first prediction of the target position and the second prediction of the target position.

9. The method of claim 8, further comprising:
   generating a command for controlling the robot based on the third prediction.

10. The method of claim 1, wherein the object is carried by an auto guided vehicle.

11. The method of claim 7, wherein the third sensor is arranged at a base of the robot or on an auto guided vehicle carrying the object.

12. A controlling system for controlling a robot comprising:
- a sensor selector coupled to a first sensor and configured to, in response to determining that an object to be operated by the robot enters a reachable area of the robot, trigger the first sensor to sense a movement of the object in the reachable area, wherein a second sensor senses the object entering the reachable area;
- a data collector:
    - coupled to the first sensor and configured to determine first position information of the object in a first coordinate system based on first sensing data received from the first sensor, the first sensor obtaining the first sensing data by sensing the movement of the object; and
    - coupled to the second sensor and configured to determine second position information of the object in a second coordinate system based on second sensing data received from the second sensor, the second sensor obtaining the second sensing data by sensing a relative motion between the robot and the object; and
- a first estimator coupled to the data collector and configured to generate, based on the first position information and the second position information, a first prediction of a target position at which the object is operated by the robot,
- wherein the first sensor is arranged on a terminal joint of the robot and the second sensor is arranged in an environment where the object and the robot can be observed by the second sensor.

13. The controlling system of claim 12, wherein the data collector is further configured to:
- receive the first sensing data from the first sensor in a first time period;
- obtain, from the first sensing data, a set of coordinate parameters of the object in the first coordinate system of the first sensor; and
- determine the first position information based on the set of coordinate parameters.

14. The controlling system of claim 12, wherein the data collector is further configured to:
- receive the second sensing data from the second sensor in a second time period, the second time period overlapping with a first time period for receiving the first sensing data;
- obtain, from the second sensing data, a first set of position relationships between the terminal joint of the robot and the object in the second coordinate system of the second sensor; and
- determine the second position information based on the first set of position relationships.

15. The controlling system of claim 12, wherein the first estimator is further configured to:
- obtain, from the first position information, a first set of sampled parameters characterizing a reference position of the object at a predetermined time point;
- obtain, from the second position information, a second set of sampled parameters characterizing a reference position relationship between the terminal joint of the robot and the object at a predetermined time point; and
- generate the first prediction of the target position by fusing the first set of sampled parameters and the second set of sampled parameters based on a predetermined fusion mode associated with an expected operation to be performed by the robot.

16. The controlling system of claim 15, wherein the predetermined fusion mode comprises at least one of:
- a predictor mode,
- a filter mode,
- a sum mode, or
- a subtraction mode.

17. The controlling system of claim 12, further comprising:
- a command generator coupled to the first estimator and configured to generate a command for controlling the robot based on the first prediction.

18. The controlling system of claim 12, wherein the data collector is further coupled to a third sensor and configured to:
- determine third position information of a terminal joint of the robot based on third sensing data received from the third sensor, the third sensing data obtaining by sensing a motion of the terminal joint of the robot; and
- generate a second prediction of the target position based on the first position information and the third position information.

19. The controlling system of claim 18, further comprising:
- a second estimator coupled to the first estimator and configured to generate a third prediction of the target position by fusing the first prediction of the target position and the second prediction of the target position.

20. The controlling system of claim 19, further comprising:
- a command generator coupled to the second estimator and configured to generate a command for controlling the robot based on the third prediction.

21. The controlling system of claim 12, wherein the object is carried by an auto guided vehicle.

22. The controlling system of claim 18, wherein the third sensor is arranged at a base of the robot or on an auto guided vehicle carrying the object.

23. An electronic device comprising:
- a processor; and
- a memory coupled to the processor and storing instructions for execution, the instructions, when executed by the processor, causing the electronic device to perform the method of claim 1.

24. A non-transitory computer readable medium comprising program instructions for causing an electronic device to perform at least the method of claim 1.

* * * * *